(12) United States Patent
Saidi et al.

(10) Patent No.: US 7,751,780 B2
(45) Date of Patent: Jul. 6, 2010

(54) METHOD AND APPARATUS FOR COLLECTING INFORMATION FROM A WIRELESS DEVICE

(75) Inventors: Ben A. Saidi, San Diego, CA (US); Nishith K. Chaubey, San Diego, CA (US); Sacchindrakumar Gopikisan Kalantri, San Diego, CA (US); Ravinder Paul Chandhok, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1129 days.

(21) Appl. No.: 11/397,420

(22) Filed: Apr. 3, 2006

(65) Prior Publication Data

US 2007/0117516 A1 May 24, 2007

Related U.S. Application Data

(60) Provisional application No. 60/739,481, filed on Nov. 23, 2005.

(51) Int. Cl.
*H04B 17/00* (2006.01)
(52) U.S. Cl. .................. 455/67.11; 455/423; 455/63.1; 455/67.13; 455/67.16
(58) Field of Classification Search .............. 455/422.1, 455/423, 456.1, 456.6, 13.4, 522, 67.11, 455/69, 63.1, 67.13, 67.16
See application file for complete search history.

(56) References Cited

U.S. PATENT DOCUMENTS

| | | | | |
|---|---|---|---|---|
| 6,538,600 | B1* | 3/2003 | Richton et al. | 342/357.1 |
| 6,665,262 | B1* | 12/2003 | Lindskog et al. | 370/216 |
| 7,089,029 | B2* | 8/2006 | Cao et al. | 455/522 |
| 2002/0194585 | A1* | 12/2002 | Connelly | 725/9 |
| 2004/0151133 | A1 | 8/2004 | Yi et al. | |
| 2005/0020284 | A1* | 1/2005 | Benco et al. | 455/456.6 |

FOREIGN PATENT DOCUMENTS

| | | |
|---|---|---|
| EP | 1143635 | 10/2001 |
| WO | WO 2003/003670 A1 * | 9/2003 |

* cited by examiner

*Primary Examiner*—Tuan A Pham
(74) *Attorney, Agent, or Firm*—Andrew Newton

(57) ABSTRACT

Systems and methodologies are described that facilitate remotely monitoring and/or controlling a media device that obtains broadcast and/or multicast transmission(s). According to various aspects, systems and methods are described that facilitate remotely controlling media device(s) that operate in connection with broadcast and/or multicast transmission(s) with limited or no reverse link (e.g., employing Forward Link Only (FLO) technology, . . . ). Such systems and methods may monitor various service issues, device performance, network performance, and the like.

23 Claims, 15 Drawing Sheets

METHOD AND APPARATUS FOR COLLECTING INFORMATION FROM A WIRELESS DEVICE

CROSS-REFERENCE TO RELATED APPLICATIONS

This application claims the benefit of U.S. Provisional Patent application Ser. No. 60/739,481 entitled "METHODS AND APPARATUS FOR COLLECTING INFORMATION FROM A WIRELESS DEVICE" which was filed Nov. 23, 2005. The entirety of the aforementioned application is herein incorporated by reference.

BACKGROUND

I. Field

The following description relates generally to wireless communications, and more particularly to remotely monitoring and/or controlling a broadcast device in a wireless communication system.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a user device. A user device within the coverage area of such base station can be employed to receive one, more than one, or all the data streams carried by the composite stream. Likewise, a user device can transmit data to the base station or another user device.

Recently, broadcast techniques such as Forward Link Only (FLO) technology have been developed and employed to provide content (e.g., video, audio, multimedia, IP datacast, . . . ) to portable user device(s). FLO technology can be designed to achieve high quality reception, both for real-time content streaming and other data services. FLO technology can provide robust mobile performance and high capacity without compromising power consumption. In addition, FLO technology may reduce costs associated with delivering multimedia content by decreasing the number of deployed base station transmitters. Furthermore, FLO technology based multimedia multicasting can be complimentary to wireless operators' cellular network data and voice services, delivering content to the same mobile devices.

FLO may employ orthogonal frequency division multiplexing (OFDM) based multicast technology without a reverse link or with a limited reverse link. Accordingly, by employing limited or no reverse links with FLO techniques, mobile device(s) commonly are unable to report network, coverage and/or service related issues, statistics and/or data. Further, in connection with FLO, mobile device(s) may be unable to be individually controlled since such technology conventionally employs multicasting.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with remotely monitoring and/or controlling a media device that obtains broadcast and/or multicast transmission(s). According to various aspects, systems and methods are described that facilitate remotely controlling media device(s) that operate in connection with broadcast and/or multicast transmission(s) with limited or no reverse link (e.g., employing Forward Link Only (FLO) technology, . . . ). Such systems and methods may monitor various service issues, device performance, network performance, and the like.

According to related aspects, a method of remotely monitoring a broadcast device is described herein. The method may comprise receiving collected information associated with a broadcast transmission from an operational media device and monitoring performance of at least one of the media device and a network based upon the collected information. Moreover, the method may include altering a subsequent broadcast transmission based upon the monitored performance.

Another aspect relates to a wireless communications apparatus that may include a memory that retains data related to a broadcast transmission and control information from a remote source. Further, a processor may enable operation pursuant to the control information for collecting the data related to the broadcast transmission, aggregate the data, and transmit feedback pertaining to the data.

Yet another aspect relates to a wireless communications apparatus for monitoring a remote device. The wireless communications apparatus may include means for receiving collected information associated with a broadcast transmission; means for monitoring performance of at least one of a media device and a network based on the collected information; and means for altering a subsequent transmission based upon the monitored performance.

Still another aspect relates to a machine-readable medium having stored thereon machine-executable instructions for controlling operation of a media device that obtains a broadcast transmission, collecting data associated with the broadcast transmission from a plurality of nodes including the media device, and transmitting the collected data via a backhaul for remote monitoring.

In accordance with another aspect, a processor is described herein, wherein the processor may execute instructions for monitoring performance of at least one of a media device and a network based upon collected information associated with a broadcast transmission obtained from the media device. Further, the processor may execute instructions for altering a subsequent broadcast transmission based upon the monitored performance.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
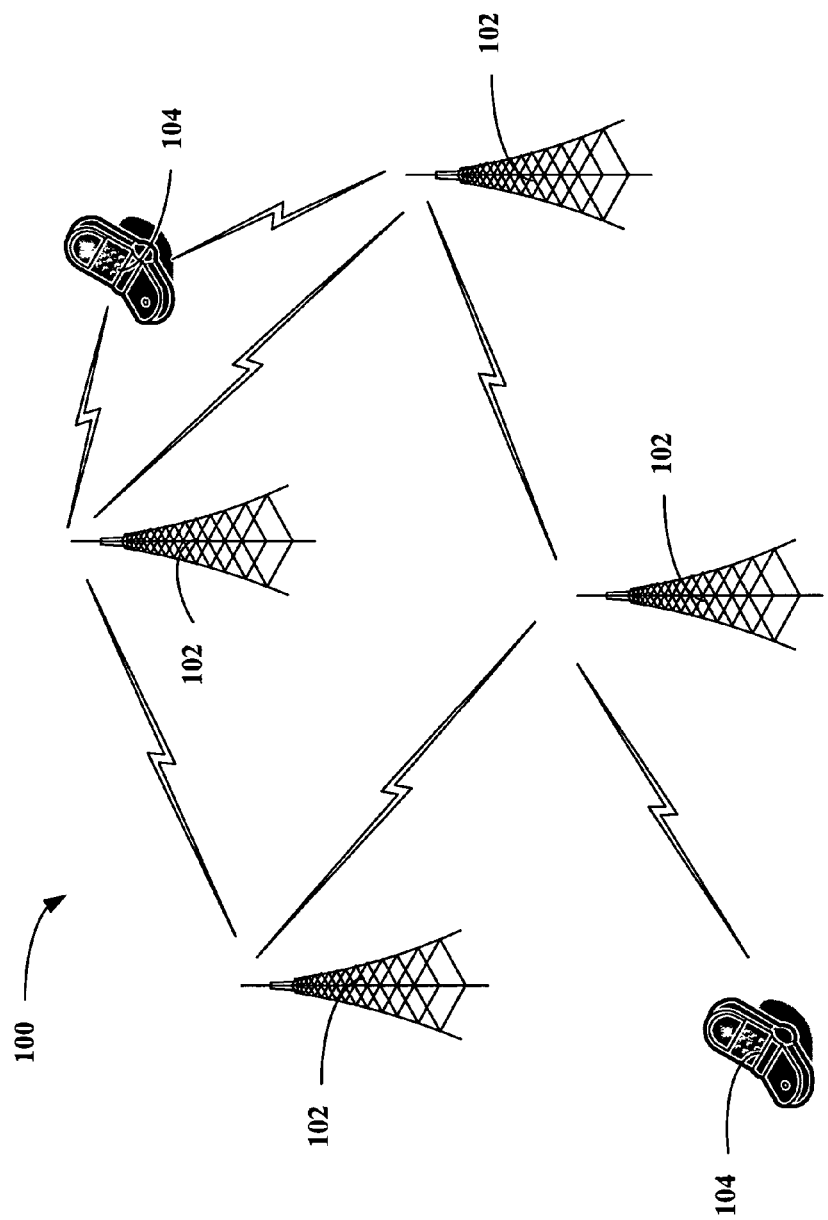
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 can comprise one or more base stations 102 (e.g., access points) in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless communication system 100.

Base stations 102 can broadcast content to mobile devices 104 by employing Forward Link Only (FLO) technology. For instance, real time audio and/or video signals may be broadcast, as well as non-real time services (e.g., music, weather, news summaries, traffic, financial information, . . . ). According to an example, content may be broadcast by base stations 102 to mobile devices 104. Mobile devices 104 may receive and output such content (e.g., by employing visual output(s), audio output(s), . . . ). Moreover, FLO technology may utilize orthogonal frequency division multiplexing (OFDM). Frequency division based techniques such as OFDM typically separate the frequency spectrum into distinct channels; for instance, the frequency spectrum may be split into uniform chunks of bandwidth. OFDM effectively partitions the overall system bandwidth into multiple orthogonal frequency channels. Additionally, an OFDM system may use time and/or frequency division multiplexing to achieve orthogonality among multiple data transmissions for multiple base stations 102.

In conventional FLO systems, mobile devices 104 may be unable to provide feedback related to network, coverage and/or service related problems. Further, mobile devices 104 commonly may lack an ability to provide statistics and/or data to base stations 102 (and/or disparate network components such as a network operation center (not shown)) due to FLO techniques forgoing utilization of a reverse link and/or employing a limited reverse link. To mitigate effects associated with the aforementioned lack of feedback, system 100 can utilize a remote probe (not shown) that enables monitoring and communicating such monitored data. Such remote probe can utilize an alternate control and/or reporting path (not shown) as compared to the communication path employed in connection with FLO transmission from base stations 102. Moreover, the remote probe can be remotely controlled to perform specified actions; however, the claimed subject matter is not so limited.

Information obtained by way of the remote probe may be employed to effectuate modification(s) within system 100, identify faults, locate hotspots and/or regions lacking coverage, evaluate signal strength, vary operation of the remote probe, etc. It is to be appreciated that the remote probe may be positioned in a fixed location and/or may be mobile. Also, the remote probe may be similar to one or more mobile devices 104; thus, by way of illustration, one or more mobile devices 104 may be a cellular telephone, laptop computer, etc. and the remote probe may be a similar cellular telephone, laptop computer, etc.; however, the subject claims are not limited to the aforementioned example.

Figure 2:
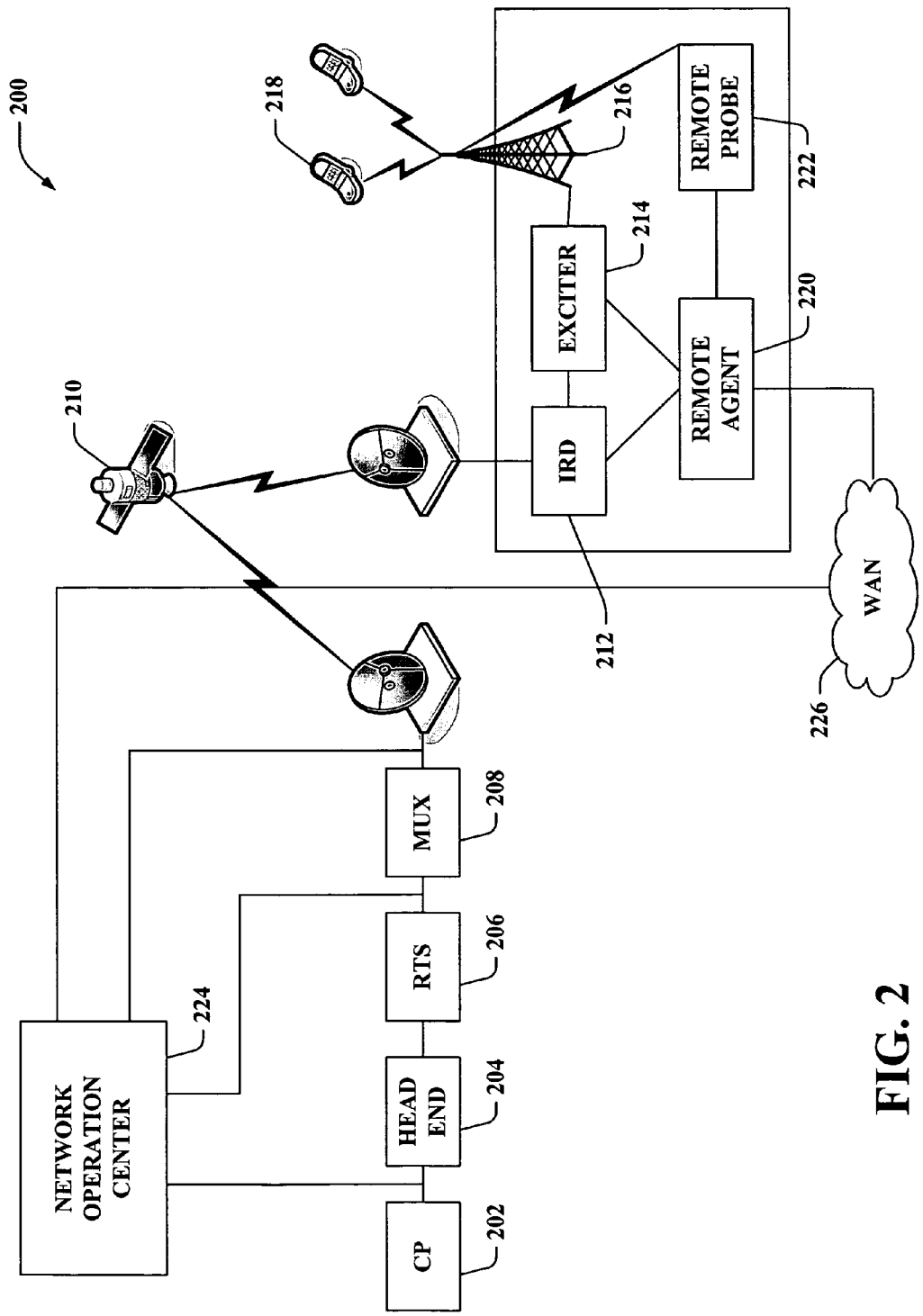
FIG. 2 is an illustration of a wireless communication system that monitors and/or controls a remotely located device to yield feedback information.

Turning to FIG. 2, illustrated is a wireless communication system 200 that monitors and/or controls a remotely located device to yield feedback information. System 200 depicts an example of an architecture that may be employed in connection with backhauling content and/or information associated with such content transmitted by way of broadcasts and/or multicasts lacking corresponding reverse link communication paths. One skilled in the art would recognize that the claimed subject matter is not limited to the example provided in system 200.

System 200 may include a content provider (CP) 202 that provides any type of content to a head end 204. For instance, CP 202 may provide real time and/or non-real time data. Any number of content providers similar to CP 202 and/or any number of head ends similar to head end 204 may be utilized in connection with system 200. Additionally, CP 202 may communicate audio, video, IP datacast, or any disparate type of content to head end 204. Content from any number of sources may be obtained at head end(s) 204 and/or a real time server (RTS) 206. Thereafter, the content may be transferred from RTS 206 to a multiplexer (MUX) 208. Content from disparate sources may be multiplexed by MUX 208. The multiplexed data may be transmitted to a satellite 210 (e.g., via the Ku band, . . . ) and thereafter communicated to various local area operation infrastructures (LOIs). A LOI may include an integrated rate decoder (IRD) 212 that obtains the downlink signal from satellite 210 and provides the data to an exciter 214. Exciter 214 may convert the data into radio frequency to enable transmission by a base station 216 to any number of mobile devices 218. Base station 216 may utilize FLO technology to broadcast and/or multicast content to one or more mobile devices 218; thus, little or no reverse link transmission from mobile devices 218 to base station 216 may occur. Mobile devices 218 may be mobile and/or located at fixed positions. Further, mobile devices 218 may be utilized intermittently and/or may be associated with limited or no usage diversity. Mobile devices 218 may obtain content from base station 216 and output (e.g., playback, . . . ) such content (e.g., with display(s), speaker(s), . . . ).

A remote agent 220 may monitor node(s) associated with the LOI. For instance, remote agent 220 may monitor IRD 212 and/or exciter 214 and/or collect data associated therewith. Additionally or alternatively, a remote probe 222 may receive transmission(s) provided by base station 216 and remote agent 220 may monitor and/or control remote probe 222. For example, remote probe 222 may be similar to mobile devices 218; thus, interactions with system 200 of remote probe 222 may be similar to those of mobile devices 218. According to an illustration, remote probe 222 may obtain audio and/or video content transmitted over a channel by base station 216. The content may be provided to remote agent 220, which may thereafter backhaul the content to a network operation center (NOC) 224 by way of a wireless area network (WAN) 226. Remote agent 220 may utilize any communication path to transmit and/or obtain data from NOC 224. It is to be appreciated that any type of connectivity (e.g., wired, wireless, combination thereof, . . . ) may be employed. According to an example, any 2G, 3G, 4G, etc. protocol may be utilized. For instance, a 1× reverse link may be employed to report limited bandwidth data. Pursuant to a further illustration, a dedicated wired broadband link may be utilized to transport high bandwidth data such as audio and/or video service data.

NOC 224 may monitor data from various locations within system 200. For instance, NOC 224 may obtain data yielded by CP 202, RTS 206 and/or MUX 208. Further, NOC 224 may obtain monitored information from remote agent 220. Thus, NOC 224 may monitor any communication path within system 200, and hence, may identify any problematic link(s) within system 200. In contrast, conventional techniques employing FLO with limited or no reverse link typically fail to allow for monitoring communications occurring at LOIs due to a lack of feedback. Accordingly, such common systems may be able to evaluate outputs from CP 202, RTS 206 and/or MUX 208, yet may fail to provide feedback and/or enable control after the downlink transmission from satellite 210.

Figure 3:
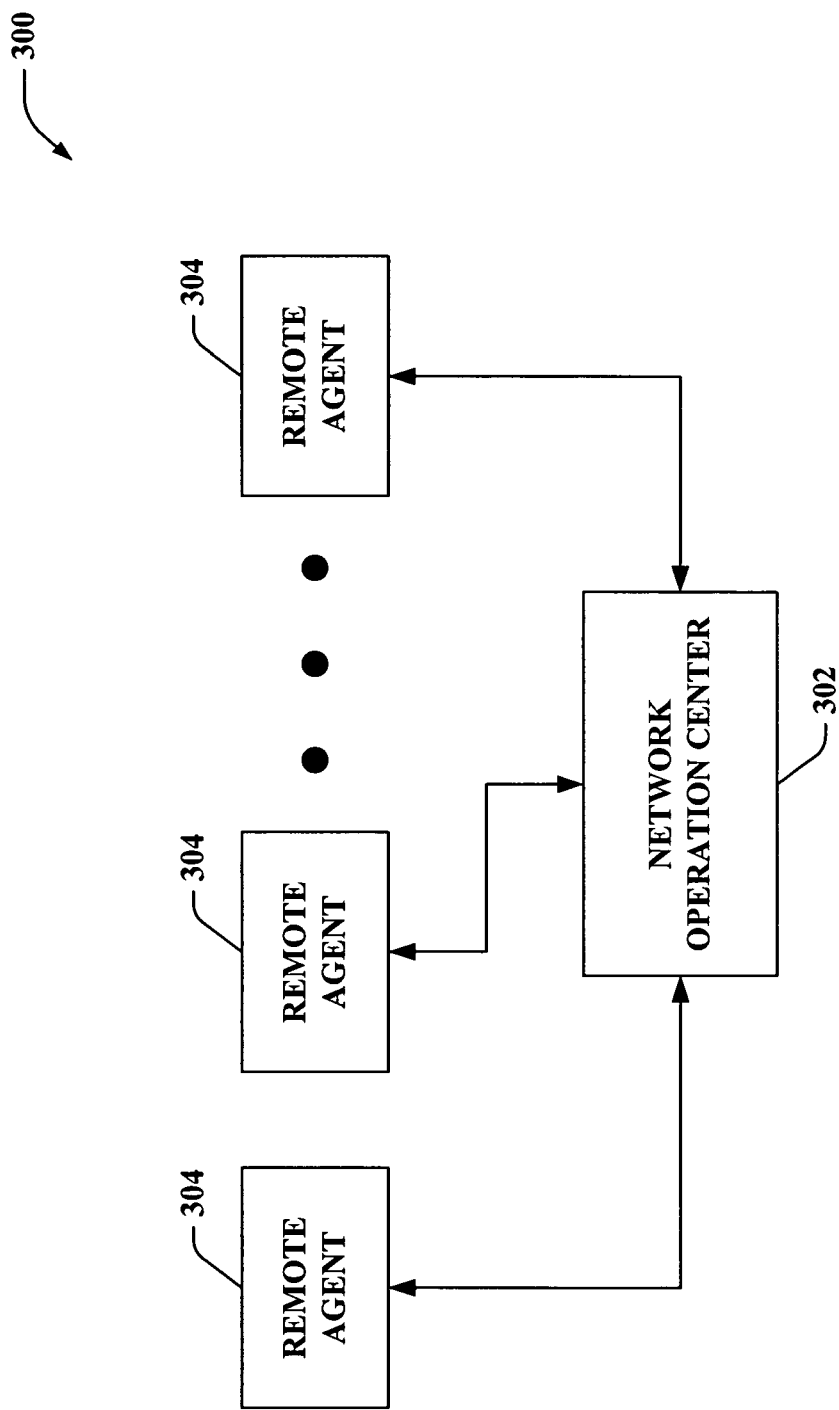
FIG. 3 is an illustration of a system that monitors and/or controls broadcast and/or multicast transmissions at disparate geographic locations.

With reference to FIG. 3, illustrated is a system 300 that monitors and/or controls broadcast and/or multicast transmissions at disparate geographic locations. System 300 may include a network operation center (NOC) 302 and any number of remote agents 304. It is to be appreciated that remote agents 304 may be located at any geographic positions and may be employed to monitor and/or control conditions associated with such locales. By way of illustration, one of the remote agents 304 may be associated with a base station employing FLO transmissions in California and a disparate one of the remote agents 304 may be related to a similar base station in Florida; however, the claimed subject matter is not limited to the aforementioned example.

NOC 302 may obtain information from one or more remote agents 304. For instance, NOC 302 may utilize such information for diagnostics, network planning, and the like. Moreover, by obtaining broadcast and/or multicast content (e.g., audio, video, IP datacast, . . . ) from various locations, NOC 302 may enable simultaneous review at a centralized location of the content. Accordingly, differences in quality of service corresponding to disparate locations can be evaluated, for instance. It is contemplated that NOC 302 and/or remote agents 304 (and/or disparate data store(s)) may store data associated with FLO transmission. By way of example, audio and/or video packets may be obtained (e.g., utilizing remote probe(s), received by remote agents 304 from any disparate node, . . . ) and thereafter retained for analysis. Further, NOC 302 may effectuate modifications based upon an evaluation of the data obtained from the remote agents 304. For example, NOC 302 may provide a signal to one of the remote agents 304 causing an associated remote probe to vary a receiving channel, data to be backhauled, and the like. Additionally or alternatively, although not depicted, it is contemplated that NOC 302 may communicate with disparate network nodes to alter modulated content outputted by a multiplexer (e.g., MUX 208 of FIG. 2, . . . ). Further, by interacting with disparate nodes, NOC 302 may correlate data from the various nodes to identify fault(s), for instance.

Significant amounts of information may be collected from operational media device(s) (e.g., remote probe(s)) by way of remote agents 304. This information may be useful for end-to-end service monitoring, device performance characterization, tuning network performance, etc. The broad variety of information that may be collected includes service data, system information, device's physical layer performance data, and the like. The following describes information that may be collected.

Service related information may be collected for monitoring purposes. Audio and/or video channels may be monitored. For example, the remote probe may be instructed by NOC 302 and/or remote agent 304 to tune to a specific media program, collect audio and/or video data along with timing information and send the data to a diagnostic interface (e.g., remote agent 304). The data may be collected at this interface and transported to NOC 302 for playback.

Pursuant to another illustration, IP datacast data may be monitored by NOC 302. The remote probe may be utilized to collect data arriving on IP datacast flow(s). The collected data can provide significant insight into the quality of the IP datacast service. For instance, an evaluation of the collected data may indicate an extent of data loss, an extent of delay due to MUX scheduling algorithms, etc.

The remote probe may be programmed to monitor other relevant system wide information to derive various statistics and understand system behavior, for instance. By way of illustration, disparate information that may be monitored and provided to NOC 302 may be related to a Media Program Guide, notification data, etc. Additionally or alternatively, application level events may be monitored such as updates to keys, changes to transmit modes, faults occurring on the remote probe, and the like.

Network related information may be collected with remote probe(s) and/or remote agent(s) 304 and provided to NOC 302. The network related information may be particularly useful when remote probe(s) are mobile. The network related information may include, for example, Local and Wide area Control Channel Information (e.g., RF Channel Description, Neighbor List, . . . ), serving wide area operation infrastructure (WOI) and/or local area operation infrastructure (LOI), wide-area differentiator (WID) and/or local-area differentiator (LID) seen by the remote probe, number of flows in a local/wide area, transmitter(s) visible to the remote probe, current transmitter serving the device, etc.

Physical layer performance data may additionally or alternatively be monitored. The remote probe may collect FLO Test Application Protocol (FTAP) specified physical layer performance data. The remote probe may decode specified FTA service flows scheduled over the FLO multiplex, collect statistics and report back to a FTAP server for analyzing the data decoded by the remote probe against the data originated in the network.

Any type of physical layer performance data may be collected. For example, overhead information symbols (OIS) performance data such as erasure information on Wide/Local OIS and/or number of flows scheduled in a superframe may be obtained. Wide-area identification channel (WIC)/local-area identification channel (LIC) performance such as WID/LID seen by the remote probe may be collected. Data Media-FLO logical channel (MLC) performance may additionally or alternatively be assembled for FTA flows under various transmit modes (e.g., cyclic redundancy check (CRC) characteristics of received data, performance of Reed Solomon (R/S) code, . . . ). Further, for enhancement flows, CRC characteristics of received data and/or performance of R/S code may be collected independently for base and enhancement layers. According to another example, coverage information may also be collected. Under mobile conditions, the remote probe may record measurements at disparate locations related to location information, received signal strength indicator (RSSI), packet error rate (PER) on OIS, control channel and/or any service flow, etc. Moreover, such recorded coverage data may be utilized (e.g., by NOC 302, one or more remote agents 304, . . . ) to generate coverage maps and/or characterize device performance under edge of coverage conditions as well as in areas with overlapping coverage from multiple transmitters.

According to another illustration, video quality parameters may be analyzed. For instance, a media player (e.g., associated with the remote probe) may provide video quality measurement parameters. These parameters may be reported by the device to yield an objective measure of the audio/video quality.

Figure 4:
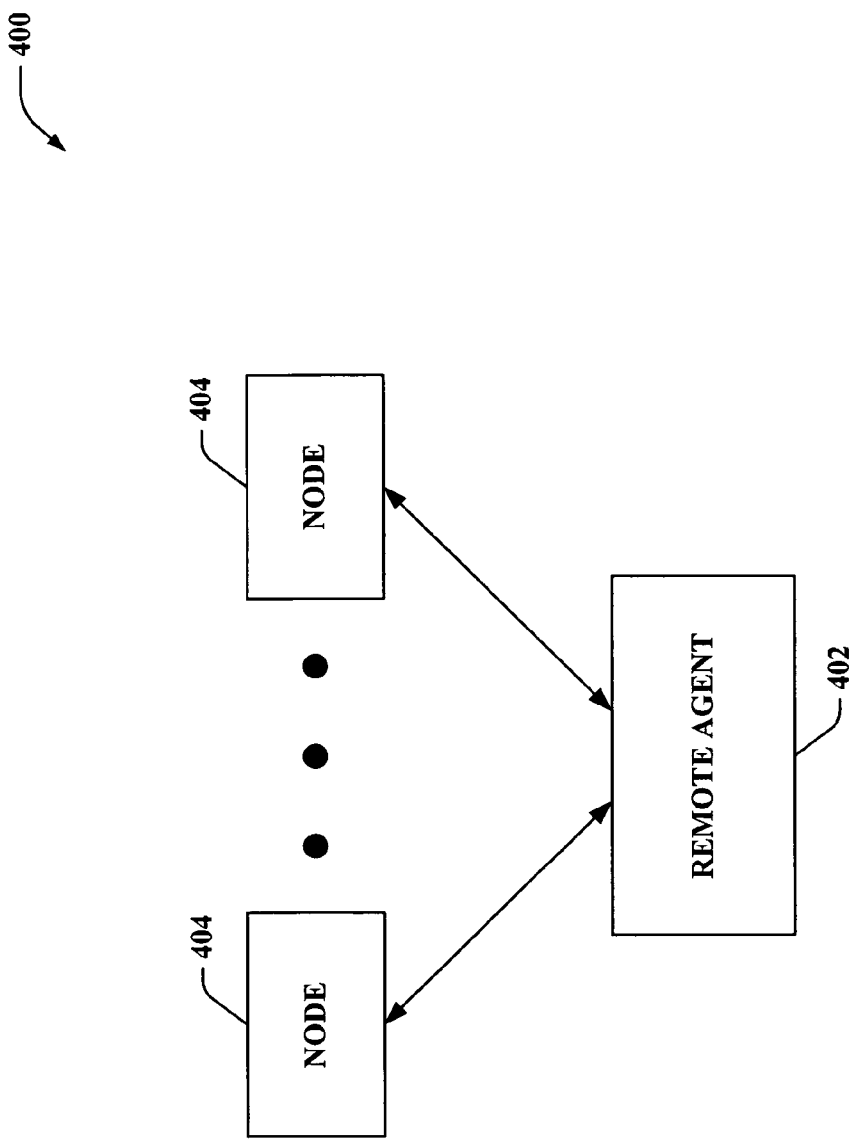
FIG. 4 is an illustration of a system that evaluates and/or modifies quality of service associated with broadcast and/or multicast transmission of content with limited or no reverse link communication.

Referring to FIG. 4, illustrated is a system 400 that evaluates and/or modifies quality of service associated with broadcast and/or multicast transmission of content with limited or no reverse link communication. System 400 includes a remote agent 402 and any number of nodes 404 that may be monitored and/or controlled. For instance, nodes 404 may be one or more of a remote probe, an IRD, an exciter, a terminal server, and the like. Additionally or alternatively, nodes 404 may be associated with a LOI. Remote agent 402 may effectuate collecting packet errors, RSSI, service data (e.g., audio/video data, FTAP, . . . ), video quality parameters, and so on from one or more of nodes 404. Remote agent 402 and nodes 404 may communicate via any type of wired, wireless, combination thereof, etc. connection. Moreover, remote agent 402 may monitor an air interface (e.g., error rate, signal strength, coverage, . . . ), application/service layer (e.g., user experience, . . . ), etc. Further, although not depicted, remote agent 402 may communicate with one or more network operation centers (NOCs) by way of, for example, a 1× reverse link for reporting limited bandwidth data, a dedicated wired broadband link for transporting high bandwidth data, and so forth. Remote agent 402 and/or NOCs may perform correlations between the air interface and media application layers; thus, device level faults may be identified, thresholds may be correlated with network events, and the like.

Figure 5:
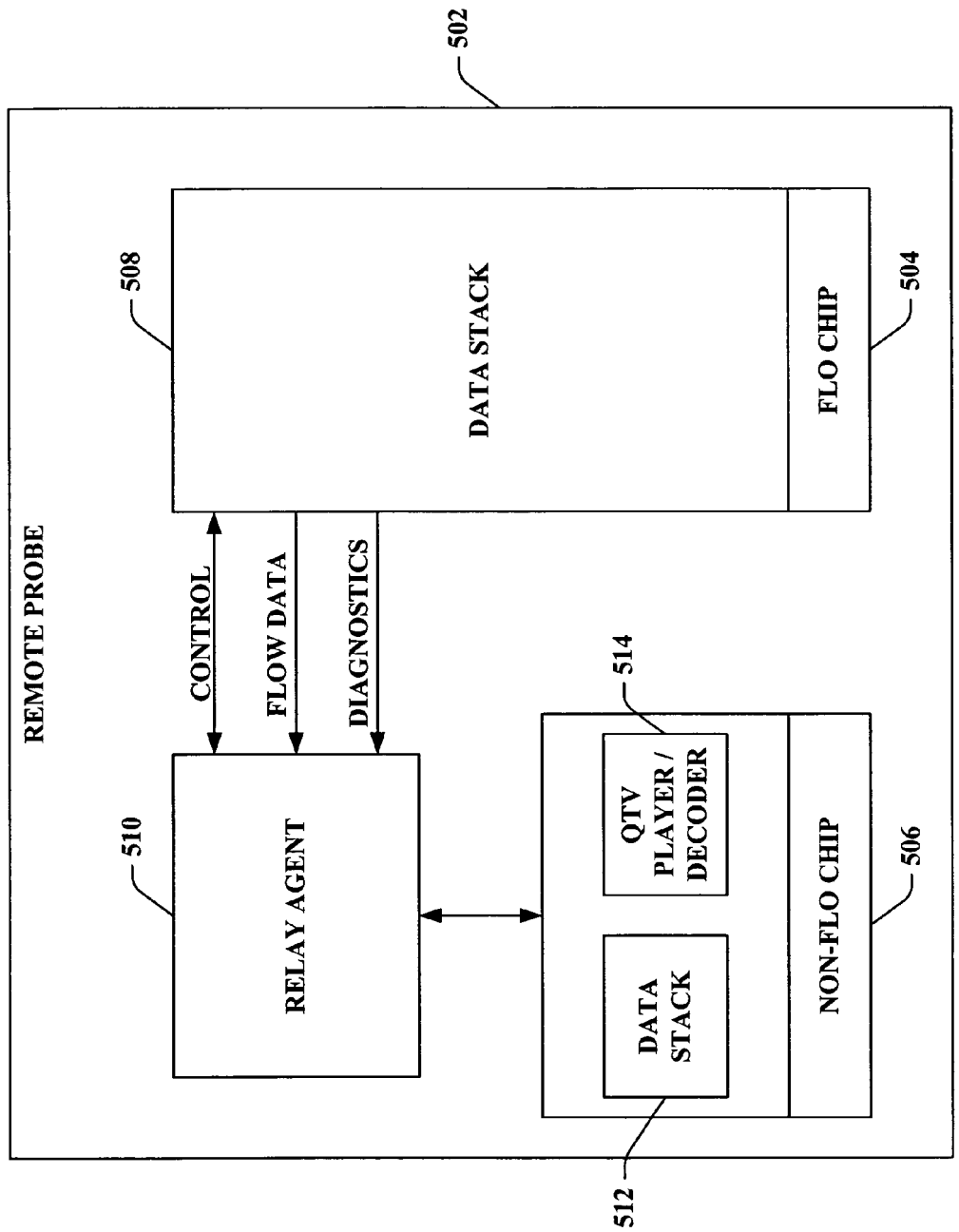
FIG. 5 is an illustration of an exemplary architecture of a remote probe that may be employed in connection with collecting data associated with FLO transmission(s).

Turning to FIG. 5, illustrated is an exemplary architecture of a remote probe 502 that may be employed in connection with collecting data associated with FLO transmission(s). Remote probe 502 may include a FLO chip 504 and a non-FLO chip 506. An application may run upon FLO chip 504 that receives content transmitted via broadcast and/or multicast. The content may be provided from a data stack 508 (which may include any number of disparate layers) associated with FLO chip 504 to a relay agent 510. For instance, flow data and/or diagnostic information may be provided to relay agent 510. Non-FLO chip 506 may be employed to playback the received content. For instance, content may be provided to a data stack 512 and/or a Qtv player/decoder 514 to generate an output (e.g., utilizing display(s), speaker(s), . . . ).

Relay agent 510 may transfer flow data, diagnostics, and the like over a backhaul to disparate component(s) (not shown) such as, for instance, a remote agent, a network operation center, etc. Further, relay agent 510 may perform bi-directional communication with such disparate component(s). Thus, a disparate component may provide a control signal to relay agent 510 (e.g., to alter a channel for receiving content, indicating data to return via the backhaul, . . . ); thus, relay agent 510 may transmit control information to data stack 508 and/or FLO chip 504 to effectuate such change; however, the claimed subject matter is not so limited.

Figure 6:
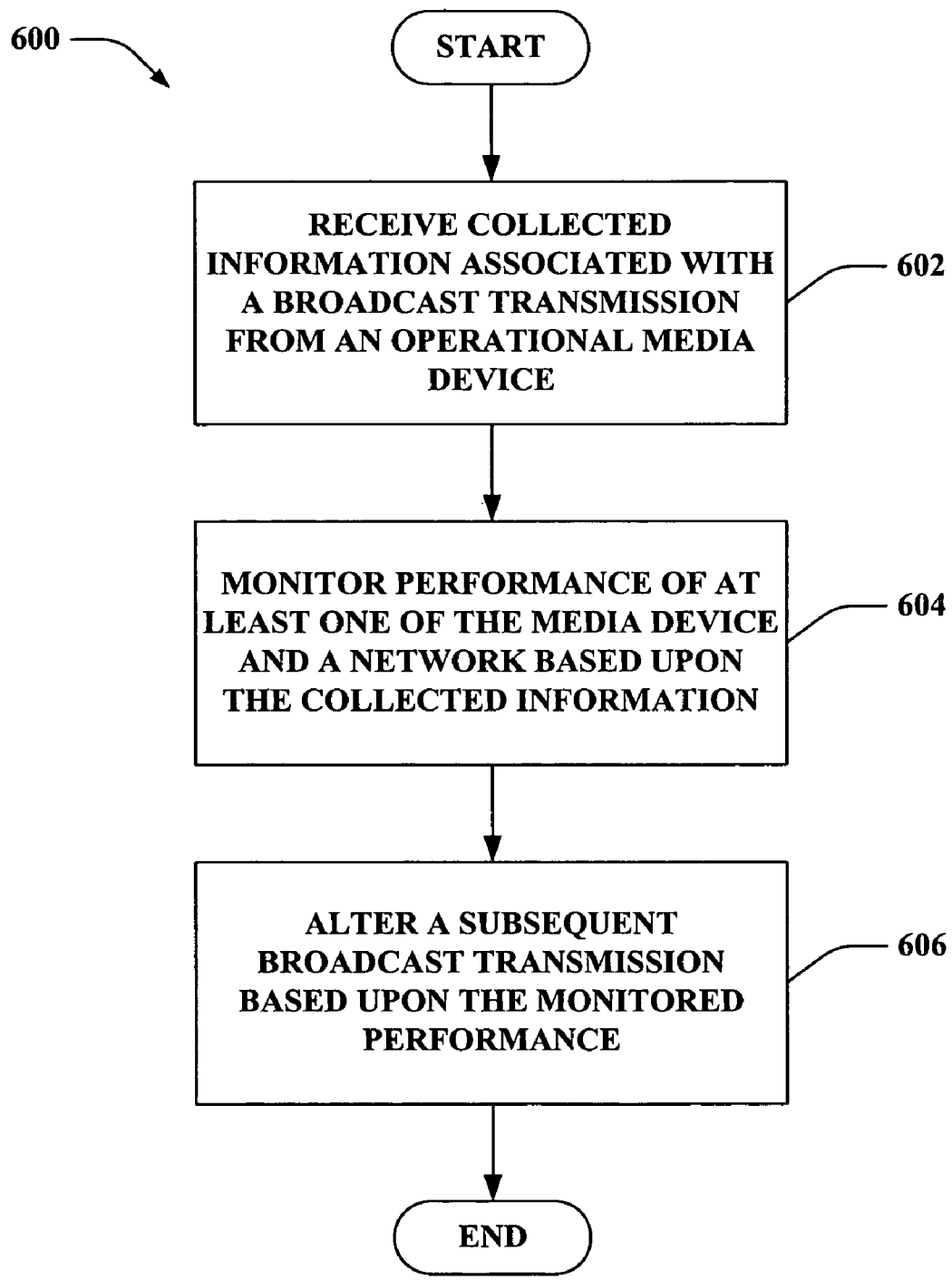
FIG. 6 is an illustration of a methodology that facilitates remotely monitoring a broadcast device.
Figure 7:
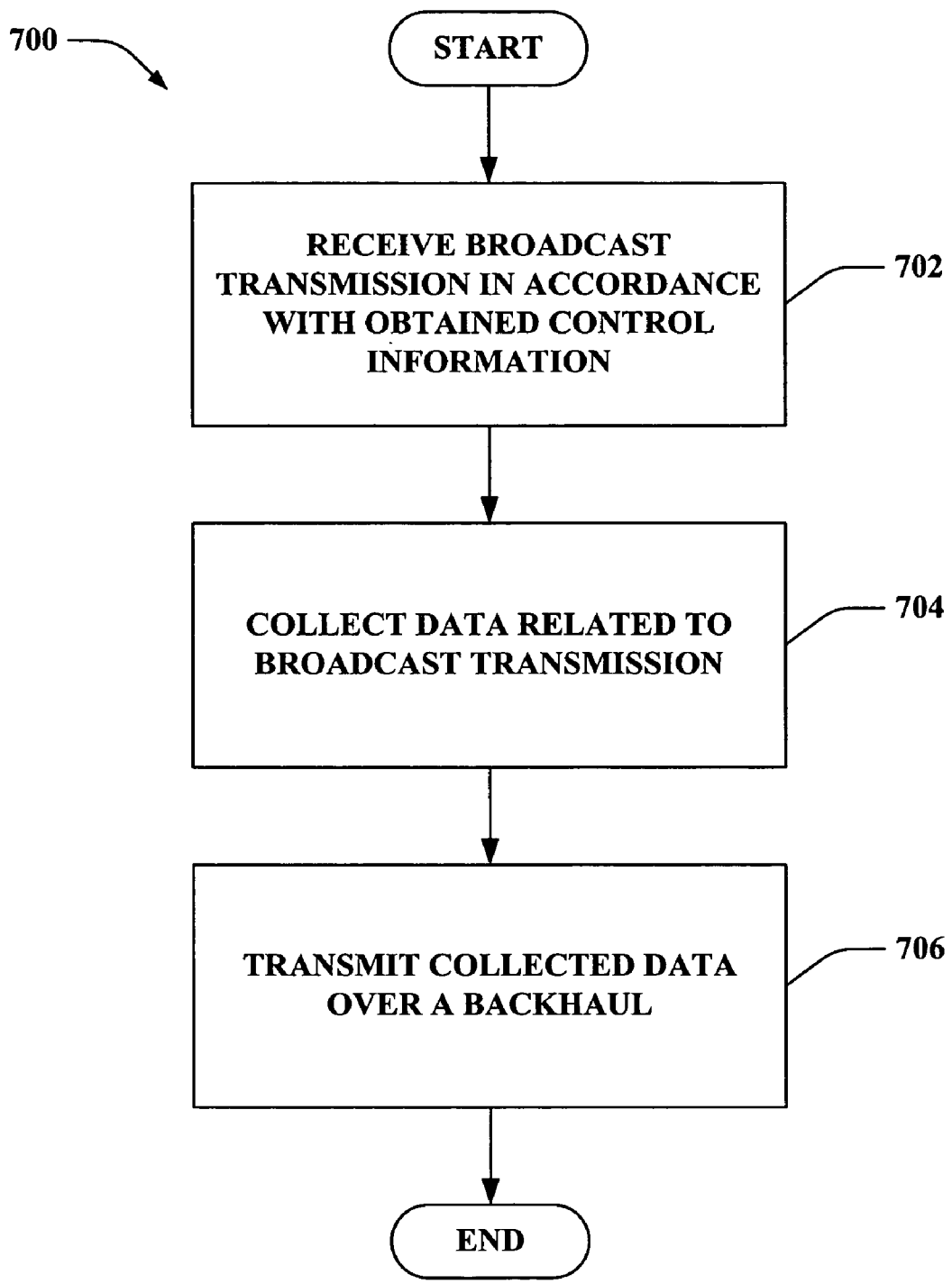
FIG. 7 is an illustration of a methodology that facilitates collecting and/or backhauling data associated with a broadcast transmission.
Figure 8:
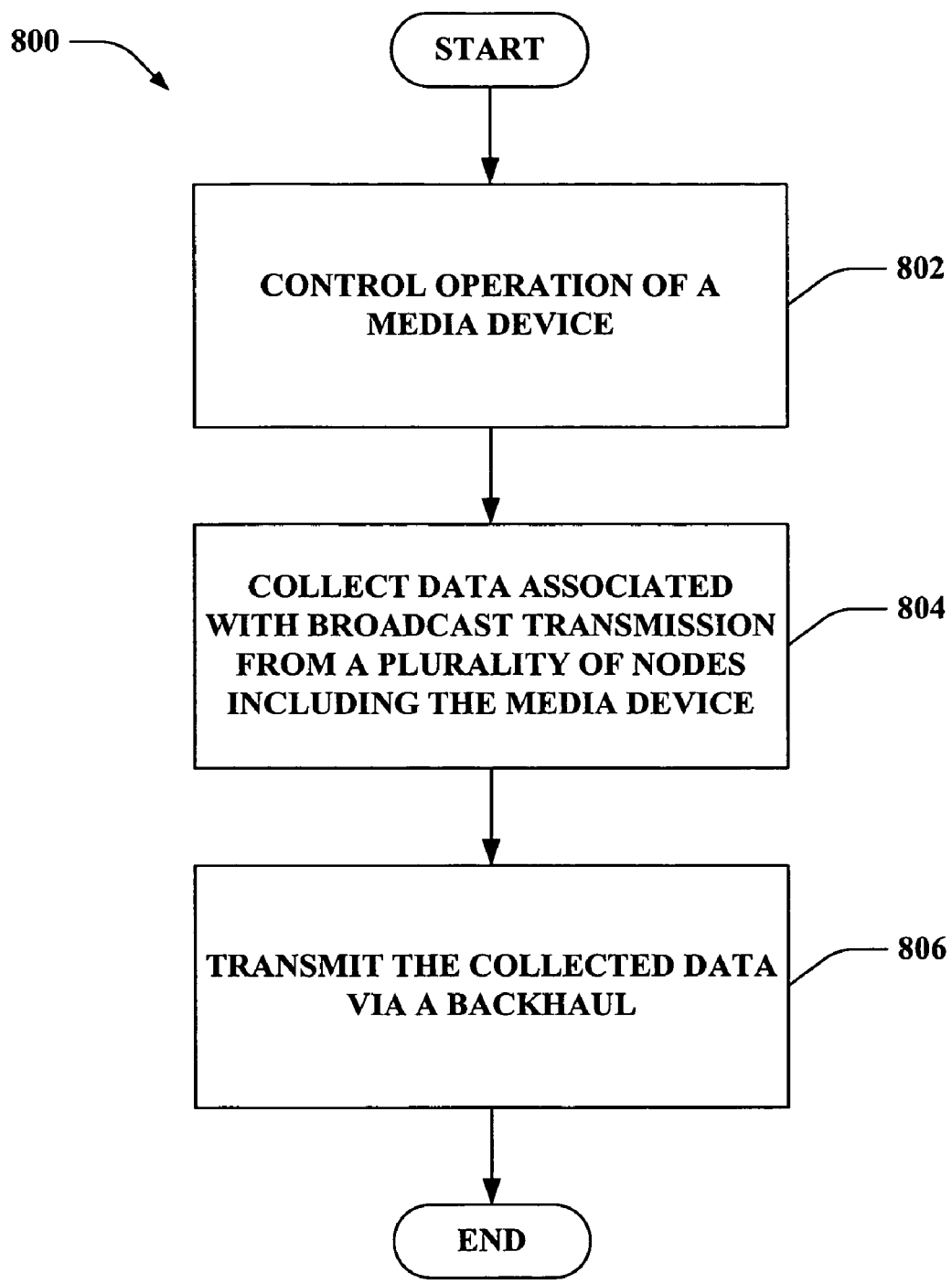
FIG. 8 is an illustration of a methodology that facilitates assembling data from a plurality of nodes associated with local area operation infrastructure(s) (LOI(s)).

Referring to FIGS. 6-8, methodologies relating to remotely monitoring and/or controlling mobile device(s) obtaining broadcast and/or multicast transmission(s) are illustrated. For example, methodologies can relate to monitoring and/or controlling such devices in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 6, illustrated is a methodology 600 that facilitates remotely monitoring a broadcast device. At 602, collected information associated with a broadcast transmission may be received from an operational media device. For instance, any type of collected information may be obtained such as service data, system information, physical layer performance data, network information, device performance information, and so forth. Additionally or alternatively, diagnostic information, call processing information, and/or device position information may be received. Further, the broadcast transmission may be associated with a lack of or limited reverse link. According to an example, although not depicted, it is to be appreciated that control information may be transmitted to the operational media device to vary data to collect and/or alter any disparate operating parameter pertaining to the device. Moreover, collected information may be received from a plurality of disparate operational media devices.

At 604, performance of at least one of the media device and a network may be monitored based upon the collected information. Thus, the collected information may be utilized for end-to-end service monitoring, device performance characterization, turning network performance, etc. By way of illustration, video and/or audio packets obtained by the operational media device may be analyzed to monitor performance of the device and/or the network. At 606, a subsequent broadcast transmission may be altered based upon the monitored performance. For instance, if monitoring leads to identifying that a particular communication link is not operating properly, such link may be modified to facilitate improving subsequent broadcast transmissions. Additionally or alternatively, the operational media device may be remotely controlled to modify operating parameters for subsequent broadcast transmission(s); thus, a channel may be varied, data to be collected can be modified, etc.

With reference to FIG. 7, illustrated is a methodology 700 that facilitates collecting and/or backhauling data associated with a broadcast transmission. At 702, a broadcast transmission may be received in accordance with obtained control information. The control information may indicate, for instance, a channel, a time, a location, etc. related to operation. At 704, data related to the broadcast transmission may be collected. Pursuant to an example, the data may be collected according to the control information; thus, the control information may specify types of data (e.g., audio and/or video packets, signal strength, network information, . . . ) to retain. By way of illustration, the collected data may be stored, transmitted upon receipt, etc. At 706, the collected data may be transmitted over a backhaul. According to an example, the data may be backhauled to a network operation center, a remote agent, etc. Moreover, the backhaul may utilize any communication path such as, for instance, a 1× reverse link, a dedicated wired broadband link, and the like.

Turning to FIG. 8, illustrated is a methodology 800 that facilitates assembling data from a plurality of nodes associated with local area operation infrastructure(s) (LOI(s)). At 802, operation of a media device may be controlled. For instance, control information may be transmitted to the media device. At 804, data associated with a broadcast transmission may be collected from a plurality of nodes including the media device. By way of example, one or more of the nodes may be an IRD, an exciter, a terminal server, etc.; however, the claimed subject matter is not so limited. Any data may be collected such as, for instance, information pertaining to faults, diagnostics, statistics, received packets, and so forth. At 806, the collected data may be transmitted via a backhaul. By collecting data from any number of nodes associated with LOI(s), methodology 800 enables providing feedback from nodes associated with the LOI(s) whereas conventional broadcast techniques employing limited or no reverse link oftentimes fail to allow for such feedback.

It will be appreciated that, in accordance with one or more aspects described herein, inferences can be made regarding controlling a remote media device, monitoring such a device, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding identifying data associated with a broadcast transmission with limited or no reverse link to collect (e.g., subset of available data to assemble, . . . ). By way of further illustration, an inference may be made pertaining to link(s) within a communications system yielding faults, degraded service, etc. It will be appreciated that the foregoing examples are illustrative in nature and are not intended to limit the number of inferences that can be made or the manner in which such inferences are made in conjunction with the various embodiments and/or methods described herein.

Figure 9:
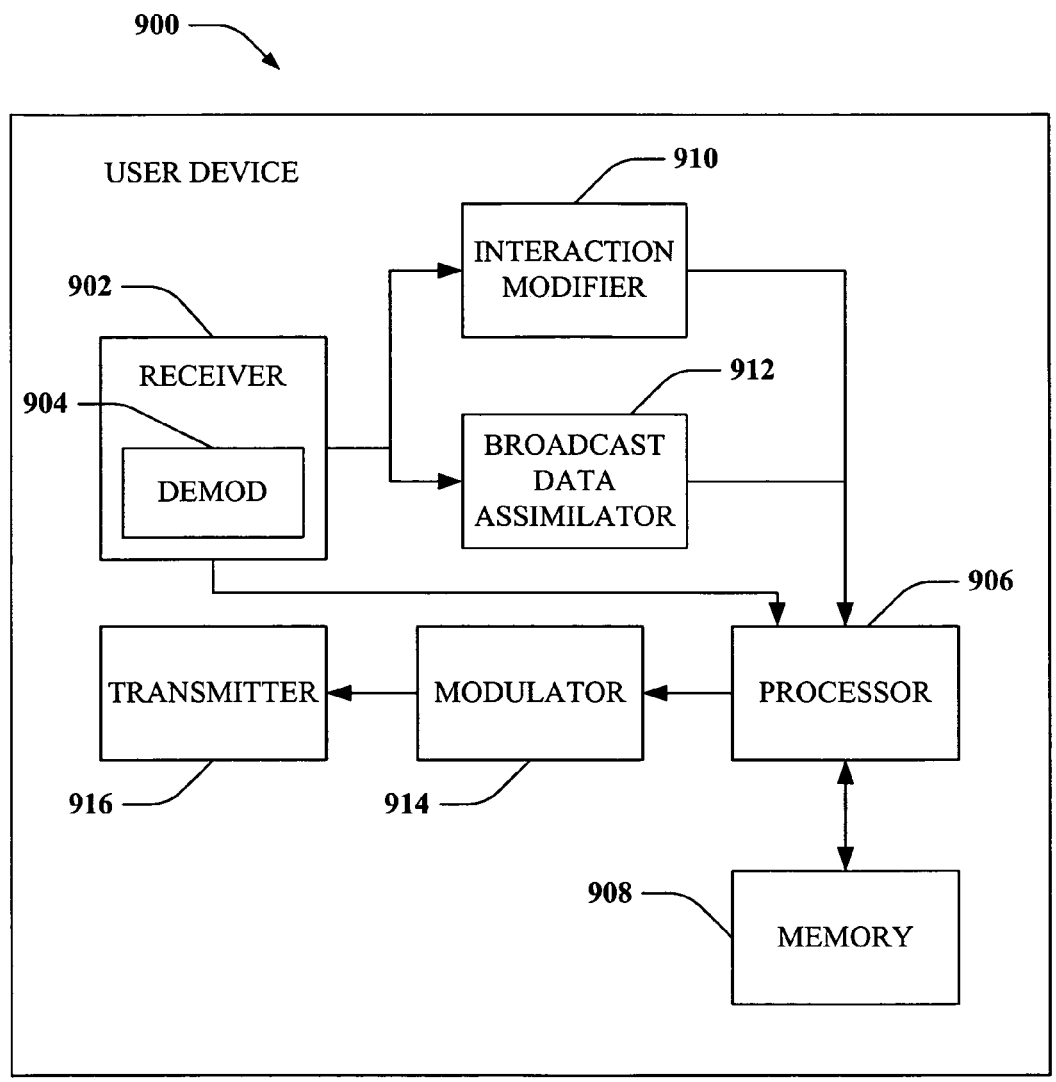
FIG. 9 is an illustration of a user device that facilitates monitoring and/or providing feedback in connection with broadcast and/or multicast transmission(s).

FIG. 9 is an illustration of a user device 900 (e.g., remote probe, . . . ) that facilitates monitoring and/or providing feedback in connection with broadcast and/or multicast transmission(s). User device 900 comprises a receiver 902 that receives a signal from, for instance, a receive antenna (not shown), and performs typical actions thereon (e.g., filters, amplifies, downconverts, etc.) the received signal and digitizes the conditioned signal to obtain samples. Receiver 902 can be, for example, an MMSE receiver, and can comprise a demodulator 904 that can demodulate received symbols and provide them to a processor 906 for channel estimation. Processor 906 can be a processor dedicated to analyzing information received by receiver 902 and/or generating information for transmission by a transmitter 916, a processor that controls one or more components of user device 900, and/or a processor that both analyzes information received by receiver 902, generates information for transmission by transmitter 916, and controls one or more components of user device 900.

User device 900 can additionally comprise memory 908 that is operatively coupled to processor 906 and that may store data to be transmitted, received data, information related to available channels, data associated with analyzed signal and/or interference strength, information related to an assigned channel, power, rate, or the like, and any other suitable information for estimating a channel and communicating via the channel. Memory 908 can additionally store protocols and/or algorithms associated with estimating and/or utilizing a channel (e.g., performance based, capacity based, etc.).

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Receiver 902 is further operatively coupled to an interaction modifier 910 that alters operation of user device 900 in response to received control information. For instance, receiver 902 may obtain control information from a remote source (not shown) and provide the control information to interaction modifier 910. In response to the control information, interaction modifier 910 may alter any operating parameter associated with user device 900. By way of illustration and not limitation, interaction modifier 910 may obtain control information that may facilitate changing type(s) of information to collect, type(s) of information to backhaul, location, on/off state, base station(s) from which to obtain broadcast and/or multicast transmission(s), etc.

Additionally, a broadcast data assimilator 912 may evaluate broadcast and/or multicast data obtained via receiver 902. Broadcast data assimilator 912 may employ operating parameters specified by interaction modifier 910. Further, broadcast data assimilator 912 may aggregate data associated with the broadcast and/or multicast transmission(s). The aggregated data may thereafter be transmitted to a remote location for further evaluation. User device 900 still further comprises a modulator 914 and a transmitter 916 that transmits the signal to, for instance, a base station, another user device, a NOC, a remote agent, etc. Although depicted as being separate from the processor 906, it is to be appreciated that interaction modifier 910, broadcast data assimilator 912 and/or modulator 914 may be part of processor 906 or a number of processors (not shown).

Figure 10:
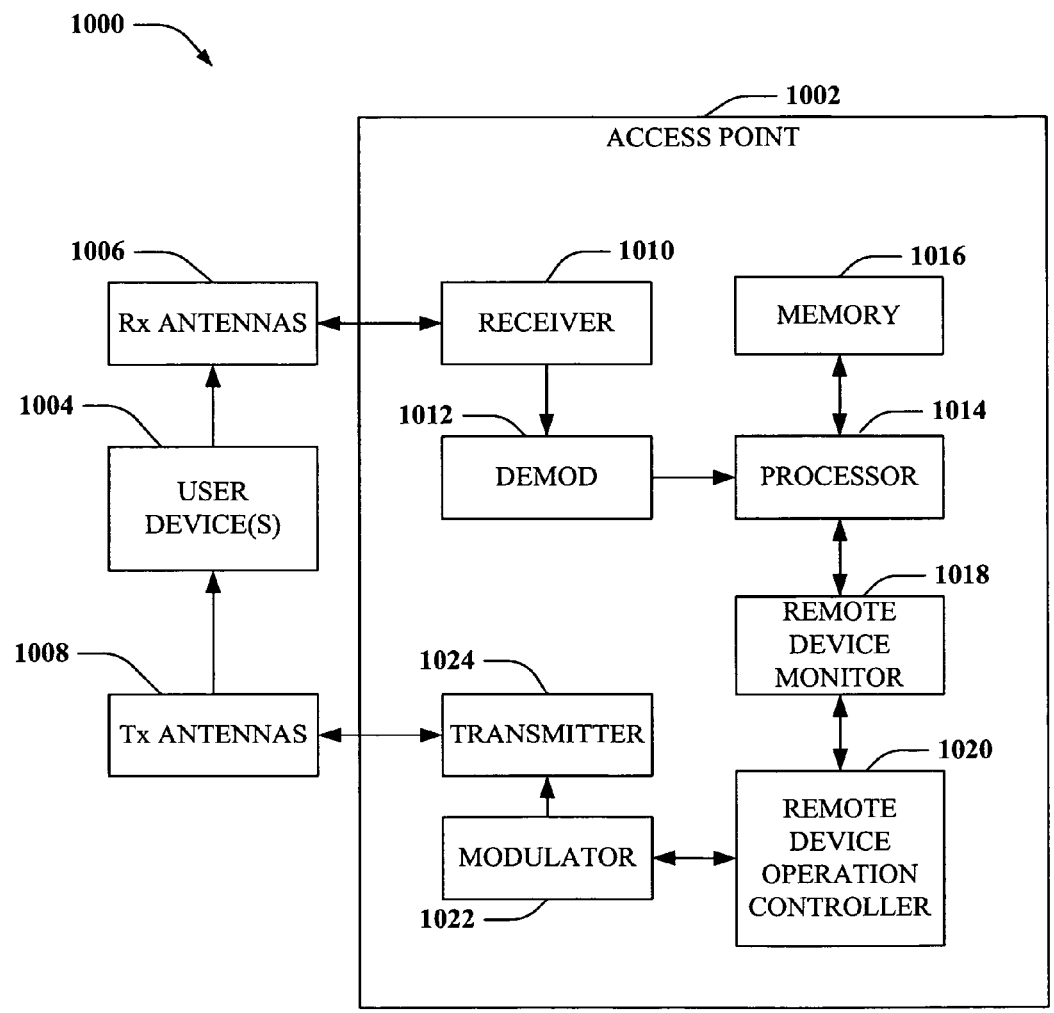
FIG. 10 is an illustration of a system that facilitates monitoring and/or controlling remote media device(s).

FIG. 10 is an illustration of a system 1000 that facilitates monitoring and/or controlling remote media device(s). System 1000 comprises an access point 1002 (e.g., base station, NOC, . . . ) with a receiver 1010 that receives signal(s) from one or more user devices 1004 through a plurality of receive antennas 1006, and a transmitter 1022 that transmits to the one or more user devices 1004 through a transmit antenna 1008. Receiver 1010 can receive information from receive antennas 1006 and is operatively associated with a demodulator 1012 that demodulates received information. Demodulated symbols are analyzed by a processor 1014 that can be similar to the processor described above with regard to FIG. 9, and which is coupled to a memory 1016 that stores information related to estimating a signal (e.g., pilot) strength and/or interference strength, data to be transmitted to or received from user device(s) 1004 (or a disparate access point (not shown)), and/or any other suitable information related to performing the various actions and functions set forth herein. Processor 1014 is further coupled to a remote device monitor 1018 that evaluates obtained data collected by a remotely positioned broadcast media device. It is to be appreciated that the broadcast media device may conventionally be associated with a lack of or limited reverse link; thus, such broadcast media device typically fails to provide feedback. Remote device monitor 1018 may evaluate the broadcast media device at a service level, physical layer, etc., for instance. Further, remote device monitor 1018 may enable playing back video and/or audio data obtained with the broadcast media device at access point 1002.

Remote device monitor 1018 may further coupled to a remote device operation controller 1020 that can enable modifying operating parameters related to a remotely located broadcast media device. For example, based upon a measured condition (e.g., fault, degraded signal strength, . . . ) identified with remote device monitor 1018, remote device operation controller 1020 may generate control information. Such control information may be provided by remote device operation controller 1020 to a modulator 1022. Modulator 1022 can multiplex the control information for transmission by a transmitter 1026 through antenna 1008 to the broadcast media device (e.g., user device 1004). Although depicted as being separate from the processor 1014, it is to be appreciated that remote device monitor 1018, remote device operation controller 1020 and/or modulator 1022 may be part of processor 1014 or a number of processors (not shown).

Figure 11:
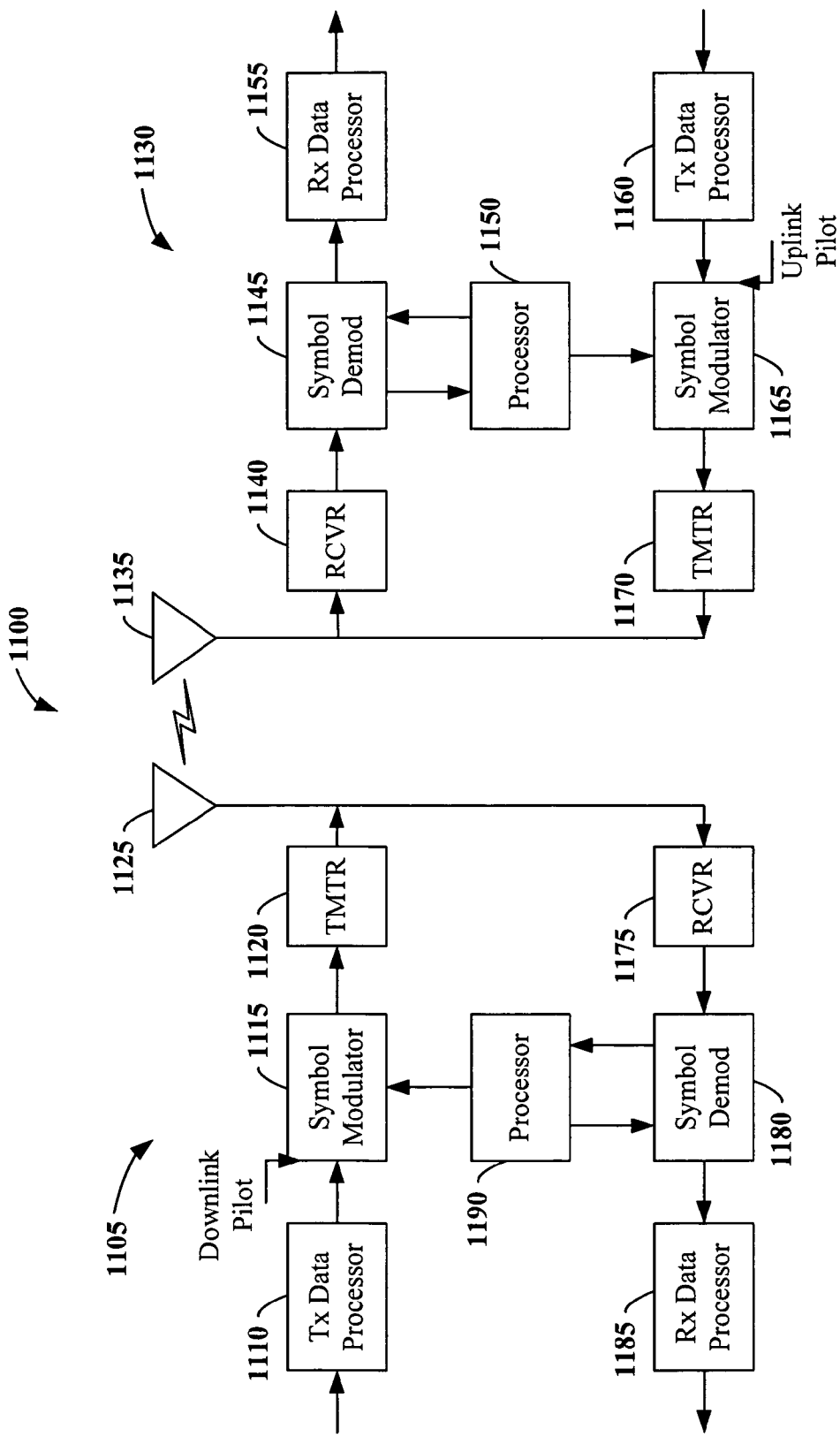
FIG. 11 is an illustration of a wireless network environment that can be employed in conjunction with the various systems and methods described herein.

FIG. 11 shows an exemplary wireless communication system 1100. The wireless communication system 1100 depicts one access point and one terminal for sake of brevity. However, it is to be appreciated that the system can include more than one access point and/or more than one terminal, wherein additional access points and/or terminals can be substantially similar or different for the exemplary access point and terminal described below. In addition, it is to be appreciated that the access point and/or the terminal can employ the systems (FIGS. 1-5 and 9-10) and/or methods (FIGS. 6-8) described herein to facilitate wireless communication there between.

Referring now to FIG. 11, on a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1115 multiplexes data and pilot symbols and provides them to a transmitter unit (TMTR) 1120. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 demodulates and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105.

At access point 1105, the uplink signal from terminal 1130 is received by the antenna 1125 and processed by a receiver unit 1175 to obtain samples. A symbol demodulator 1180 then processes the samples and provides received pilot symbols and data symbol estimates for the uplink. An RX data processor 1185 processes the data symbol estimates to recover the traffic data transmitted by terminal 1130. A processor 1190 performs channel estimation for each active terminal transmitting on the uplink. Multiple terminals may transmit pilot concurrently on the uplink on their respective assigned sets of pilot subbands, where the pilot subband sets may be interlaced.

Processors 1190 and 1150 direct (e.g., control, coordinate, manage, etc.) operation at access point 1105 and terminal 1130, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1190 and 1150.

Figure 12:
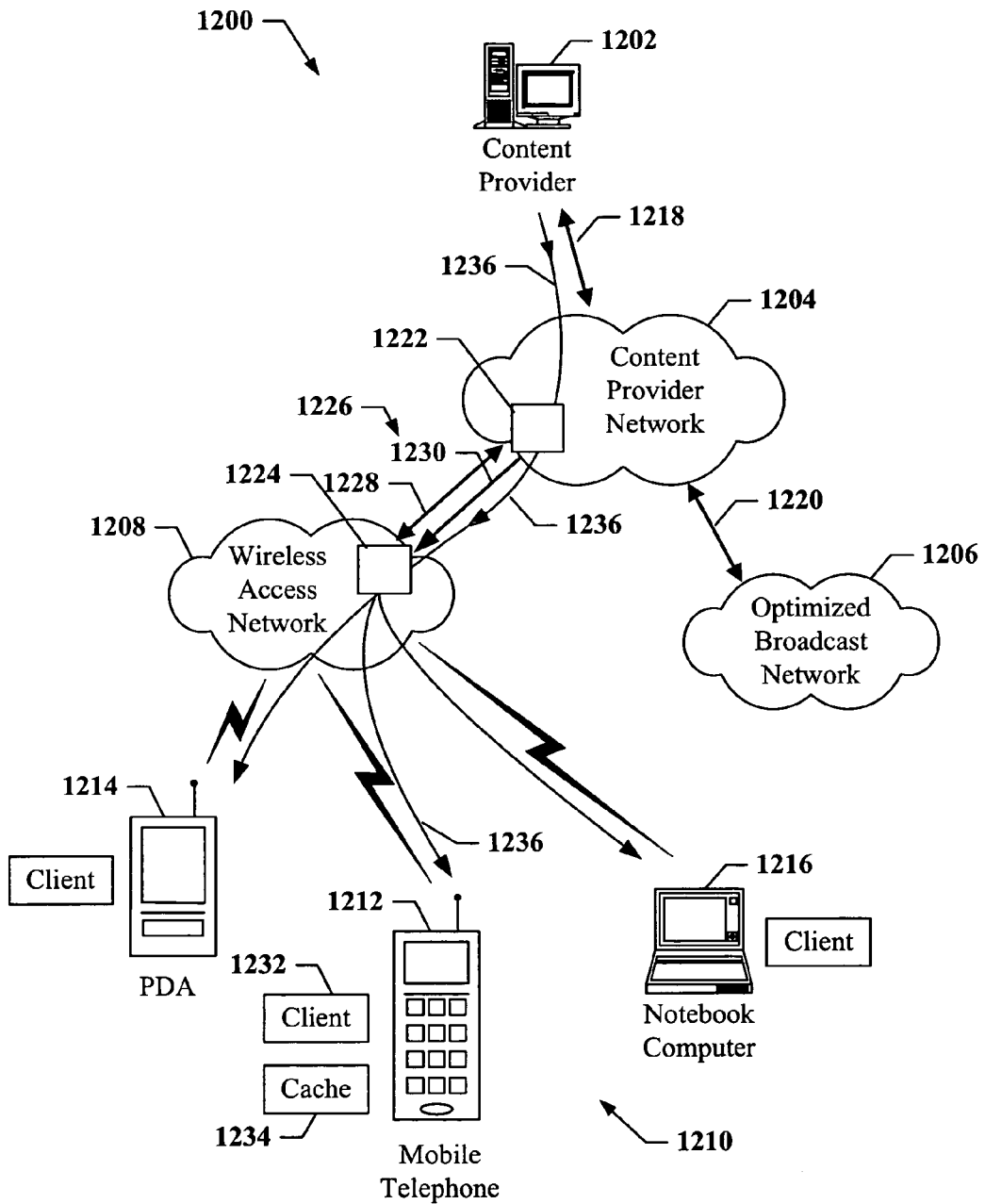
FIG. 12 is an illustration of a communication network that comprises an embodiment of a transport system that operates to create and transport multimedia content flows across data networks.

FIG. 12 shows an embodiment of a communication network 1200 that comprises an embodiment of a transport system that operates to create and transport multimedia content flows across data networks. For example, the transport system is suitable for use in transporting content clips from a content provider network to a wireless access network for broadcast distribution.

Network 1200 comprises a content provider (CP) 1202, a content provider network 1204, an optimized broadcast network 1206, and a wireless access network 1208. Network 1200 also includes devices 1210 that comprise a mobile telephone 1212, a personal digital assistance (PDA) 1214, and a notebook computer 1216. Devices 1210 illustrate just some of the devices that are suitable for use in one or more embodiments of the transport system. It should be noted that although three devices are shown in FIG. 12, virtually any number of devices, or types of devices are suitable for use in the transport system.

Content provider 1202 operates to provide content for distribution to users in network 1200. The content comprises video, audio, multimedia content, clips, real-time and non real-time content, scripts, programs, data or any other type of suitable content. Content provider 1202 provides the content to content provider network 1204 for distribution. For example, content provider 1202 communicates with content provider network 1204 via a communication link 1218, which comprises any suitable type of wired and/or wireless communication link.

Content provider network 1204 comprises any combination of wired and wireless networks that operate to distribute content for delivery to users. Content provider network 1204 communicates with optimized broadcast network 1206 via a link 1220. Link 1220 comprises any suitable type of wired and/or wireless communication link. Optimized broadcast network 1206 comprises any combination of wired and wireless networks that are designed to broadcast high quality content. For example, optimized broadcast network 1206 may be a specialized proprietary network that has been optimized to deliver high quality content to selected devices over a plurality of optimized communication channels.

In one or more embodiments, the transport system operates to deliver content from content provider 1202 for distribution to a content server (CS) 1222 at content provider network 1204 that operates to communicate with a broadcast base station (BBS) 1224 at wireless access network 1208. CS 1222 and BBS 1224 communicate using one or more embodiments of a transport interface 1226 that allows content provider network 1204 to deliver content in the form of content flows to wireless access network 1208 for broadcast/multicast to devices 1210. Transport interface 1226 comprises a control interface 1228 and a bearer channel 1230. Control interface 1228 operates to allow CS 122 to add, change, cancel, or otherwise modify contents flows that flow from content provider network 1204 to wireless access network 1208. Bearer channel 1230 operates to transport the content flows from content provider network 1204 to wireless access network 1208.

In one or more embodiments, CS 1222 uses transport interface 1226 to schedule a content flow to be transmitted to BBS 1224 for broadcast/multicast over wireless access network 1208. For example, the content flow may comprise a non real-time content clip that was provided by content provider 1202 for distribution using content provider network 1204. In an embodiment, CS 1222 operates to negotiate with BBS 1224 to determine one or more parameters associated with the content clip. Once BBS 1224 receives the content clip, it broadcasts/multicasts the content clip over wireless access network 1208 for reception by one or more devices 1210. Any of devices 1210 may be authorized to receive the content clip and cache it for later viewing by the device user.

For example, device 1210 comprises a client program 1232 that operates to provide a program guide that displays a listing of content that is scheduled for broadcast over wireless access network 1208. The device user may then select to receive any particular content for rendering in real-time or to be stored in a cache 1234 for later viewing. For example the content clip may be scheduled for broadcast during the evening hours, and device 1212 operates to receive the broadcast and cache the content clip in cache 1234 so that the device user may view the clip the next day. Typically, the content is broadcast as part of a subscription service and the receiving device may need to provide a key or otherwise authenticate itself to receive the broadcast.

In one or more embodiments, the transport system allows CS 1222 to receive program-guide records, program contents, and other related information from content provider 1202. CS 1222 updates and/or creates content for delivery to devices 1210.

Figure 13:
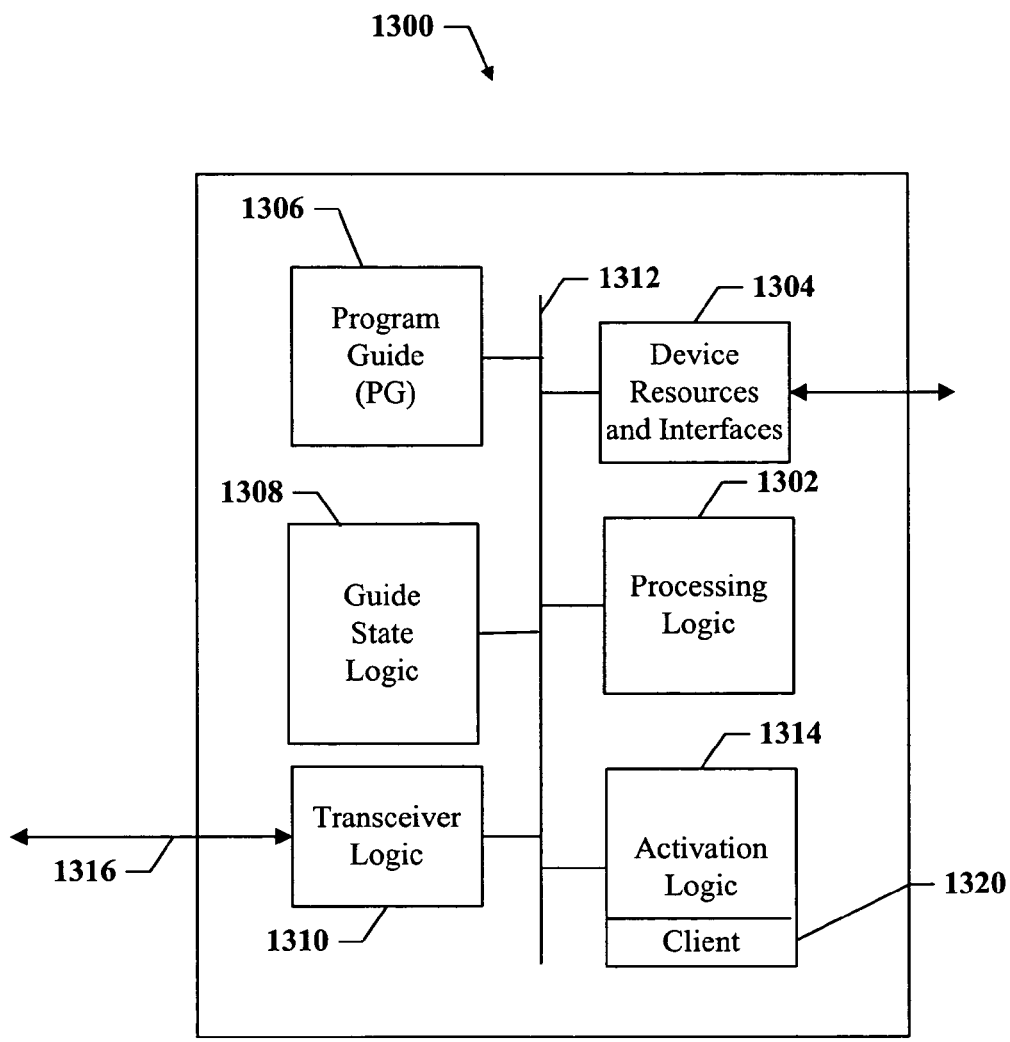
FIG. 13 is an illustration of a content provider server suitable for use in an embodiment of a content delivery system.

FIG. 13 shows an embodiment of a content provider server 1300 suitable for use in an embodiment of the content delivery system. For example, server 1300 may be used as the server 1202 in FIG. 12. Server 1300 comprises processing logic 1302, resources and interfaces 1304, and transceiver logic 1310, all coupled to an internal data bus 1312. Server 1300 also comprises activation logic 1314, program guide (PG) 1306, and PG records logic 1308, which are also coupled to data bus 1312.

In one or more embodiments, processing logic 1302 comprises a CPU, processor, gate array, hardware logic, memory elements, virtual machine, software, and/or any combination of hardware and software. Thus, processing logic 1302 generally comprises logic to execute machine-readable instructions and to control one or more other functional elements of server 1300 via internal data bus 1312.

The resources and interfaces 1304 comprise hardware and/or software that allow server 1300 to communicate with internal and external systems. For example, the internal systems may include mass storage systems, memory, display driver, modem, or other internal device resources. The external systems may include user interface devices, printers, disk drives, or other local devices or systems.

Transceiver logic 1310 comprises hardware logic and/or software that operates to allow server 1300 to transmit and receive data and/or other information with remote devices or systems using communication channel 1316. For example, in an embodiment, communication channel 1316 comprises any suitable type of communication link to allow server 1300 to communicate with a data network.

Activation logic 1314 comprises a CPU, processor, gate array, hardware logic, memory elements, virtual machine, software, and/or any combination of hardware and software. Activation logic 1314 operates to activate a CS and/or a device to allow the CS and/or the device to select and receive content and/or services described in PG 1306. In one or more embodiments, activation logic 1314 transmits a client program 1320 to the CS and/or the device during the activation process. Client program 1320 runs on the CS and/or the device to receive PG 1306 and display information about available content or services to the device user. Thus, activation logic 1314 operates to authenticate a CS and/or a device, download client 1320, and download PG 1306 for rendering on the device by client 1320.

PG 1306 comprises information in any suitable format that describes content and/or services that are available for devices to receive. For example, PG 1306 may be stored in a local memory of server 1300 and may comprise information such as content or service identifiers, scheduling information, pricing, and/or any other type of relevant information. In an embodiment, PG 1306 comprises one or more identifiable sections that are updated by processing logic 1302 as changes are made to the available content or services.

PG record 1308 comprises hardware and/or software that operates to generate notification messages that identify and/or describe changes to PG 1306. For example, when processing logic 1302 updates PG 1306, PG records logic 1308 is notified about the changes. PG records logic 1308 then generates one or more notification messages that are transmitted to CSs, which may have been activated with server 1300, so that these CSs are promptly notified about the changes to PG 1306.

In an embodiment, as part of the content delivery notification message, a broadcast indicator is provided that indicates when a section of PG 1306 identified in the message will be broadcast. For example, in one embodiment, the broadcast indicator comprises one bit to indicate that the section will be broadcast and a time indicator that indicates when the broadcast will occur. Thus, the CSs and/or the devices wishing to update their local copy of the PG records can listen for the broadcast at the designated time to receive the updated section of the PG records.

In an embodiment, the content delivery notification system comprises program instructions stored on a computer-readable media, which when executed by a processor, for instance, processing logic 1302, provides the functions of server 1300 described herein. For example, the program instructions may be loaded into server 1300 from a computer-readable media, such as a floppy disk, CDROM, memory card, FLASH memory device, RAM, ROM, or any other type of memory device or computer-readable media that interfaces to server 1300 through resources 1304. In another embodiment, the instructions may be downloaded into server 1300 from an external device or network resource that interfaces to server 1300 through transceiver logic 1310. The program instructions, when executed by processing logic 1302, provide one or more embodiments of a guide state notification system as described herein.

Figure 14:
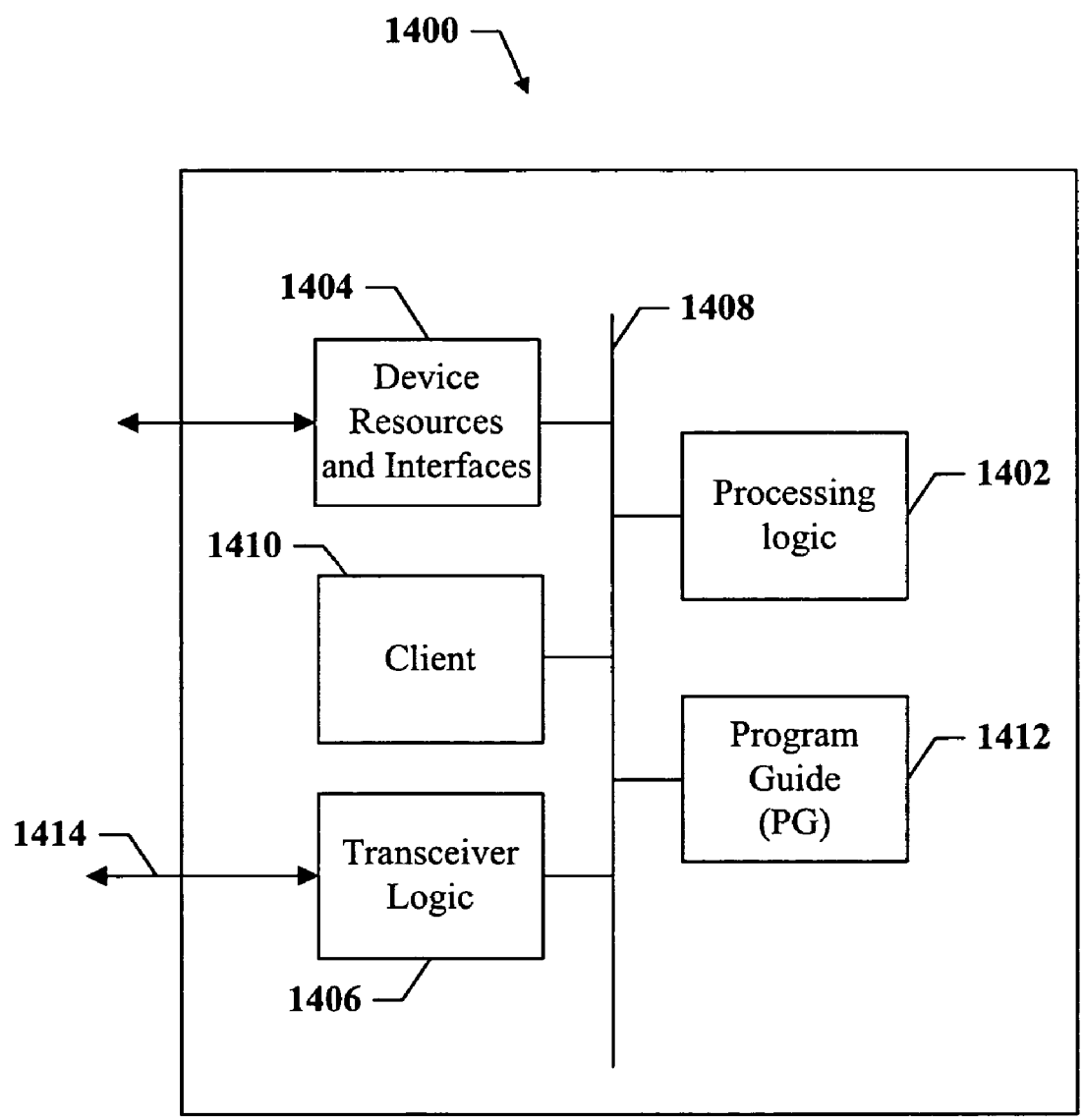
FIG. 14 is an illustration of a content server (CS) or device suitable for use in one or more embodiments of a content delivery system.

FIG. 14 shows an embodiment of a content server (CS) or device 1400 suitable for use in one or more embodiments of a content delivery system. For example, CS 1400 may be CS 1222 or device 1210 shown in FIG. 12. CS 1400 comprises processing logic 1402, resources and interfaces 1404, and transceiver logic 1406, all coupled to a data bus 1408. CS 1400 also comprises a client 1410, a program logic 1414 and a PG logic 1412, which are also coupled to data bus 1408.

In one or more embodiments, processing logic 1402 comprises a CPU, processor, gate array, hardware logic, memory elements, virtual machine, software, and/or any combination of hardware and software. Thus, processing logic 1402 generally comprises logic configured to execute machine-readable instructions and to control one or more other functional elements of CS 1400 via internal data bus 1408.

The resources and interfaces 1404 comprise hardware and/or software that allow CS 1400 to communicate with internal and external systems. For example, internal systems may include mass storage systems, memory, display driver, modem, or other internal device resources. The external systems may include user interface devices, printers, disk drives, or other local devices or systems.

Transceiver logic 1406 comprises hardware and/or software that operate to allow CS 1400 to transmit and receive data and/or other information with external devices or systems through communication channel 1414. For example, communication channel 1414 may comprise a network communication link, a wireless communication link, or any other type of communication link.

During operation, CS and/or device 1400 is activated so that it may receive available content or services over a data network. For example, in one or more embodiments, CS and/or device 1400 identifies itself to a content provider server during an activation process. As part of the activation process, CS and/or device 1400 receives and stores PG records by PG logic 1412. PG 1412 contains information that identifies content or services available for CS 1400 to receive. Client 1410 operates to render information in PG logic 1412 on CS and/or device 1400 using the resources and interfaces 1404. For example, client 1410 renders information in PG logic 1412 on a display screen that is part of the device. Client 1410 also receives user input through the resources and interfaces so that a device user may select content or services.

In an embodiment, CS 1400 receives notification messages through transceiver logic 1406. For example, the messages may be broadcast or unicast to CS 1400 and received by transceiver logic 1406. The PG notification messages identify updates to the PG records at PG logic 1412. In an embodiment, client 1410 processes the PG notification messages to determine whether the local copy at PG logic 1412 needs to be updated. For example, in one or more embodiments, the notification messages include a section identifier, start time, end time, and version number. CS 1400 operates to compare the information in the PG notification messages to locally stored information at the existing PG logic 1412. If CS 1400 determines from the PG notification messages that one or more sections of the local copy at PG logic 1412 needs to be updated, CS 1400 operates to receive the updated sections of the PG in one of several ways. For example, the updated sections of the PG may be broadcasted at a time indicated in the PG notification messages, so that transceiver logic 1406 may receive the broadcasts and pass the updated sections to CS 1400, which in turn updates the local copy at PG logic 1412.

In other embodiments, CS 1400 determines which sections of the PG need to be updated based on the received PG update notification messages, and transmits a request to a CP server to obtain the desired updated sections of the PG. For example, the request may be formatted using any suitable format and comprise information such as a requesting CS identifier, section identifier, version number, and/or any other suitable information.

In one or more embodiments, CS 1400 performs one or more of the following functions in one or more embodiments of a PG notification system. It should be noted that the following functions might be changed, rearranged, modified, added to, deleted, or otherwise adjusted within the scope of the embodiments.

1. The CS is activated for operation with a content provider system to receive content or services. As part of the activation process, a client and PG are transmitted to the CS.
2. One or more PG notification messages are received by the CS and used to determine if one or more sections of the locally stored PG need to be updated.
3. In an embodiment, if the CS determines that one or more sections of the locally stored PG need to be updated, the CS listens to a broadcast from the distribution system to obtain the updated sections of the PG that it needs to update its local copy.
4. In other embodiments, the CS transmits one or more request messages to the CP to obtain the updated sections of the PG it needs.
5. In response to the request, the CP transmits the updated sections of the PG to the CS.
6. The CS uses the received updated sections of the PG to update its local copy of the PG.

In one or more embodiments, the content delivery system comprises program instructions stored on a computer-readable media, which when executed by a processor, such as processing logic 1402, provides the functions of the content delivery notification system as described herein. For example, instructions may be loaded into CS 1400 from a computer-readable media, such as a floppy disk, CDROM, memory card, FLASH memory device, RAM, ROM, or any other type of memory device or computer-readable media that interfaces to CS 1400 through the resources and interfaces 1404. In other embodiments, the instructions may be downloaded into CS 1400 from a network resource that interfaces to CS 1400 through transceiver logic 1406. The instructions, when executed by processing logic 1402, provide one or more embodiments of a content delivery system as described herein.

It should be noted that CS 1400 represents just one implementation and that other implementations are possible within the scope of the embodiments.

Figure 15:
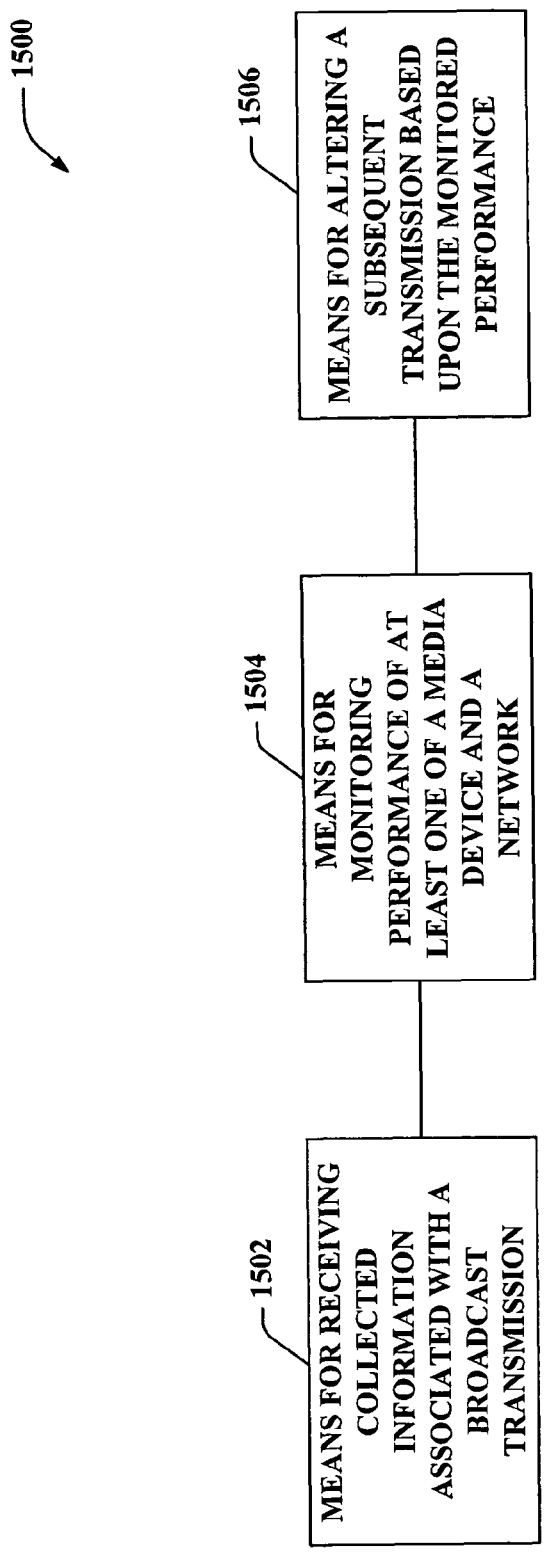
FIG. 15 is an illustration of a system that monitors and/or controls a remote media device that obtains broadcast and/or multicast transmission(s).

With reference to FIG. 15, illustrated is a system 1500 that monitors and/or controls a remote media device that obtains broadcast and/or multicast transmission(s). It is to be appreciated that system 1500 is represented as including functional blocks, which can be functional blocks that represent functions implemented by a processor, software, or combination thereof (e.g., firmware). System 1500 can be implemented in a wireless device and can include means for receiving collected information associated with a broadcast transmission 1502. For example, the collected information may be obtained from remote media device(s). Further, system 1500 may comprise means for monitoring performance of at least one of a media device and a network 1504. Pursuant to an illustration, the collected information may be evaluated to enable such monitoring. Moreover, system 1500 may include means for altering a subsequent transmission based upon the monitored performance 1506.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates remotely monitoring a broadcast network, comprising:
    receiving collected information associated with a broadcast transmission of content from an operational media device;
    monitoring performance of the broadcast network based upon the collected information; and
    altering a subsequent broadcast transmission based upon the monitored performance, wherein the broadcast transmission is associated with at least one of a limited reverse link and no reverse link,
    wherein receiving information from disparate nodes in addition to the operational media device; and correlating the information from the disparate nodes and the collected information from the operational media device to identify a fault.

2. The method of claim 1, wherein the collected information comprises at least one of service information, system information, network information, and device performance information.

3. The method of claim 1, wherein the collected information comprises device diagnostic information.

4. The method of claim 1, wherein the collected information comprises device position information.

5. The method of claim 1, wherein the broadcast transmission is in accordance with Forward Link Only (FLO) technology.

6. The method of claim 1, receiving collected information via a communication path differing from a path associated with the broadcast transmission.

7. The method of claim 6, receiving collected information via a wireless area network.

8. The method of claim 6, receiving collected information via a 1× reverse link.

9. The method of claim 6, receiving collected information via a wired broadband link.

10. The method of claim 6, receiving collected information via a wireless connection in accordance with at least one of a 2G protocol, a 3G protocol, and a 4G protocol.

11. The method of claim 1, further comprising:
    receiving collected information from a plurality of operational media devices; and
    comparing the collected information corresponding to each of the plurality of operational media devices to identify a location with diminished quality of service.

12. The method of claim 1, further comprising transmitting control information to the operational media device to modify an operating parameter.

13. The method of claim 12, wherein the operating parameter is associated with at least one of a channel, a location, information to collect, and information to backhaul.

14. The method of claim 1, wherein monitoring performance further comprises playing back collected information.

15. A wireless communications system including a broadcast network, comprising:
    means for receiving collected information associated with a broadcast transmission of content;
    means for monitoring performance of the broadcast network based on the collected information; and
    means for altering a subsequent transmission based upon the monitored performance, wherein the broadcast transmission is associated with at least one of a limited reverse link and no reverse link,
    wherein receiving information from disparate nodes in addition to a operational media device; and correlating the information from the disparate nodes and the collected information from the operational media device to identify a fault.

16. The wireless communications system of claim 15, further comprising means for controlling the media device from a remote location.

17. The wireless communications system of claim 15, further comprising means for monitoring at least one of service information, system information, network information, and device performance information.

18. The wireless communications system of claim 15, further comprising means for obtaining feedback in a Forward Link Only (FLO) system.

19. The wireless communications system of claim 15, further comprising means for receiving collected information via a communication path differing from a path associated with the broadcast transmission.

20. The wireless communications system of claim 15, further comprising means for identifying geographic locations associated with diminished quality of service.

21. The wireless communications system of claim 15, further comprising means for locating a fault associated with the broadcast transmission based upon the monitored performance.

22. A processor that executes the following instructions:
    monitoring performance of a broadcast network based upon collected information associated with a broadcast transmission of content obtained from a media device; and
    altering a subsequent broadcast transmission based upon the monitored performance, wherein the broadcast transmission is associated with at least one of a limited reverse link and no reverse link,
    wherein receiving information from disparate nodes in addition to the operational media device; and correlating the information from the disparate nodes and the collected information from the operational media device to identify a fault.

23. The processor of claim 22, wherein the broadcast transmission is a Forward Link Only (FLO) transmission.

* * * * *